US009462661B2

(12) United States Patent
Barroso et al.

(10) Patent No.: US 9,462,661 B2
(45) Date of Patent: Oct. 4, 2016

(54) LIGHT SYSTEM AND METHOD

(75) Inventors: Andre Melon Barroso, Aachen (DE); Robin Martijn Soudant, Utracht (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 215 days.

(21) Appl. No.: 13/977,932

(22) PCT Filed: Jan. 5, 2012

(86) PCT No.: PCT/IB2012/050059
§ 371 (c)(1),
(2), (4) Date: Jul. 2, 2013

(87) PCT Pub. No.: WO2012/095765
PCT Pub. Date: Jul. 19, 2012

(65) Prior Publication Data
US 2013/0293152 A1  Nov. 7, 2013

(30) Foreign Application Priority Data
Jan. 13, 2011 (EP) ...................... 11150811

(51) Int. Cl.
*G05F 1/00* (2006.01)
*H05B 37/02* (2006.01)
*H05B 39/04* (2006.01)
*H05B 41/36* (2006.01)
*H05B 33/08* (2006.01)

(52) U.S. Cl.
CPC ............ *H05B 37/02* (2013.01); *H05B 33/086* (2013.01); *H05B 37/0281* (2013.01); *Y02B 20/42* (2013.01)

(58) Field of Classification Search
USPC .................................. 315/291–311
See application file for complete search history.

(56) References Cited

U.S. PATENT DOCUMENTS

| 5,343,121 A | 8/1994 | Terman et al. |
| 5,589,741 A | 12/1996 | Terman et al. |
| 7,550,931 B2 * | 6/2009 | Lys et al. ...................... 315/291 |

(Continued)

FOREIGN PATENT DOCUMENTS

| JP | 2001176679 A | 6/2001 |
| JP | 2008202283 A | 9/2008 |

(Continued)

OTHER PUBLICATIONS

P.J. Keep et al., "Windows in the Intensive Therapy Unit", 1980 Anaesthesia, vol. 35, pp. 257-262.

(Continued)

*Primary Examiner* — Brandon S Cole
(74) *Attorney, Agent, or Firm* — Meenakshy Chakravorty

(57) ABSTRACT

A method for providing light to a room that has a wall includes arranging in the room a light source having a light intensity control device, providing a model for light intensity simulating light conditions in a first period of a day, and operating the light intensity control device in accordance with the model so that light is provided to the room. Further, a system for providing illumination in a room that has a wall includes a light source having one or more individual light sources. The light source of the system also has a light controlling device for controlling intensity and/or direction of light and/or color of light emitted. The system further includes a controller device that controls the light controlling device in accordance with a simulation program simulating changes in daylight over a period of time.

20 Claims, 5 Drawing Sheets

(56) References Cited

U.S. PATENT DOCUMENTS

| | | |
|---|---|---|
| 8,499,593 B2 | 8/2013 | Van De Sluis et al. |
| 2003/0057887 A1* | 3/2003 | Dowling et al. .............. 315/291 |
| 2005/0134525 A1* | 6/2005 | Tanghe et al. ................. 345/1.1 |
| 2005/0162736 A1 | 7/2005 | Cromer et al. |
| 2009/0122528 A1 | 5/2009 | Tsai et al. |
| 2009/0128044 A1 | 5/2009 | Nevins |
| 2009/0196023 A1 | 8/2009 | Heiking et al. |
| 2009/0322251 A1 | 12/2009 | Hilgers |
| 2010/0231131 A1 | 9/2010 | Anderson |

FOREIGN PATENT DOCUMENTS

| | | |
|---|---|---|
| JP | 2009043629 A | 2/2009 |
| WO | WO2004094896 | 11/2004 |
| WO | WO2009008785 | 1/2009 |

OTHER PUBLICATIONS

Sky Factory webpage, "The Sky V Video Catalog", 4 pages, printed Aug. 29, 2010.

\* cited by examiner

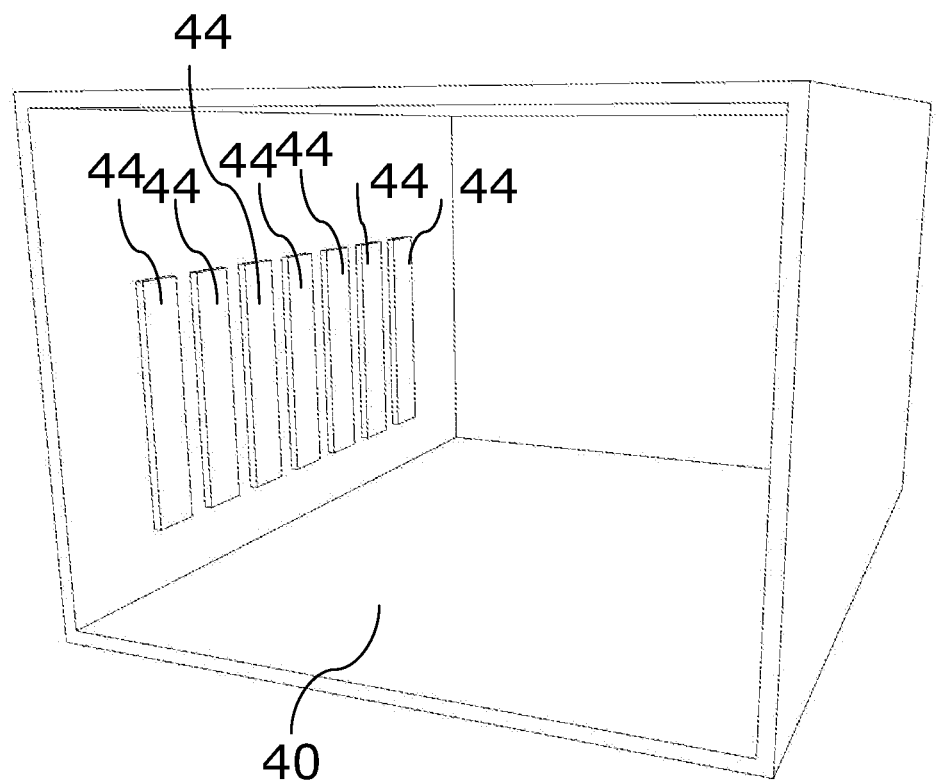
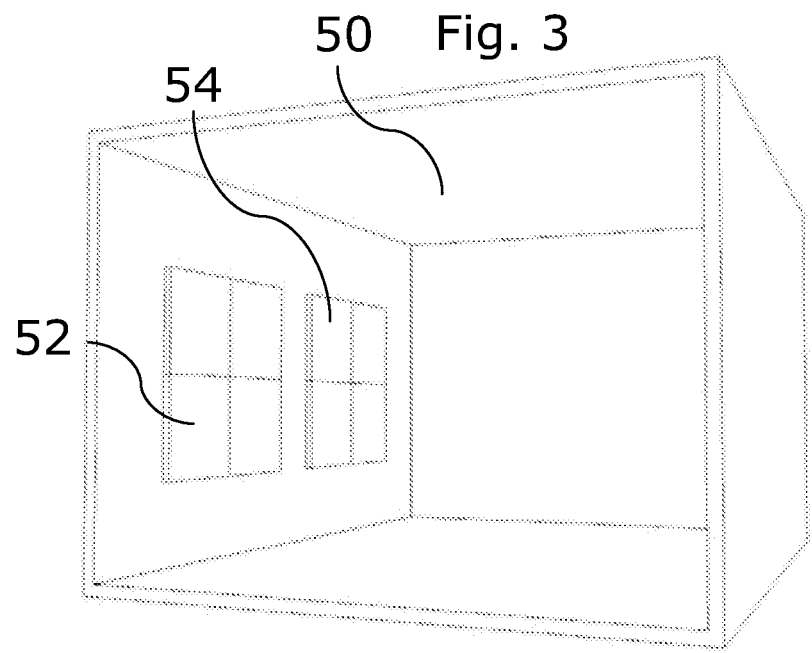
Fig. 4

LIGHT SYSTEM AND METHOD

FIELD OF THE INVENTION

The present invention relates to a light system and method for providing light to a room. The system and method further relates to a system for providing light to a room having no or limited light entering from the outside. The method and system is especially suited for providing light, over a period of time, simulating the passing of a day.

BACKGROUND OF THE INVENTION

This invention addresses the problem of inadequate illumination in hospital rooms that may lead to general confusion and delirium. It proposes and describes a system that supports temporal and spatial orientation by rendering lighting scenes that mimics the dynamics of a skylight window. Patients subject to the proposed illumination are expected to be better oriented in terms of time flow and room orientation. Although the system will mainly benefit patients in spaces that lack adequate windows, the possibility of rendering lighting conditions that resemble sunny 'upbeat' days will also benefit a broader range of patients during dark winters and gloomy rainy days.

The inventor of the present invention has appreciated that a system and method according to the present invention for providing light to a room, especially an intensive care unit, will reduce the risk of delirium of a patient and has in consequence devised the present invention.

Delirium is an etiologically nonspecific organic cerebral syndrome characterized by concurrent disturbances of consciousness and attention, perception, thinking, memory, psychomotor behavior, emotion, and the sleep-wake schedule. The incidence of delirium among ICU patients has been reported to be high despite great variation in the statistics (20-80%).

The negative impact of ICU delirium can be felt in several spheres. Economically, delirium has been consistently linked to greater healthcare expenditures due to longer hospitalization periods. Furthermore, patients who develop delirium are more likely to die or suffer complications on the short or medium term as delirium has been shown to shown to be a good predictor of long-term cognitive impairment among ICU patients. In the social sphere, staff morale is affected because of reduced job satisfaction experienced when dealing with agitated and non-compliant patients.

As a state of cognitive confusion all preventive and intervention measures against delirium have the primary objective of re-orienting patients. Non-pharmacological approaches that complement the use of drugs with dangerous side-effects generally include the correction of sensory deficiencies (e.g. eyeglasses and hearing aids) for supporting patient orientation and minimizing misperceptions of objects in the environment as well as periodic cognitive stimulation and verbal reorientation.

In this regard, lighting conditions are known to greatly influence temporal and spatial orientation of humans. Throughout the day, the sky color and the intensity of the illumination provided by the sun varies. Shadows are constantly moving, changing length and direction. Such dynamics provide intuitive ways on which humans rely to measure passage of time or locating cardinal points. Unfortunately, this information is largely lost in indoor environments and in particular hospital rooms in which patients do not have the benefit of appropriate external lighting conditions via windows.

In a study conducted by Keep et al. (Windows in the intensive therapy unit. Keep, P., James, J. and Inman, M. 3, 1980, Anaesthesia, Vol. 35, pp. 257-262) the authors observed that patients who had survived a stay of at least 48 h in an ICU had a less accurate memory of the length of their stay, and were less well orientated in time if the unit was windowless. Furthermore, the authors reported that the incidence of hallucinations and delusions was more than twice as high in the windowless unit when compared to a similar unit with translucent but not transparent windows.

SUMMARY OF THE INVENTION

It would be advantageous to achieve a system that allow control of light conditions in a room, especially in an intensive care unit, or any other recovery room where patients are located for an extended period of time without the possibility to observe changes in outside conditions. In general, the invention preferably seeks to mitigate, alleviate or eliminate one or more of the above mentioned disadvantages singly or in any combination. In particular, it may be seen as an object of the present invention to provide a method that solves the above mentioned problems, or other problems, of the prior art.

To better address one or more of these concerns, in a first aspect of the invention a method for providing light to a room is provided. The room comprises a wall, or at least one wall. The method comprises the step of arranging in the room a light source having a light intensity control device. The method comprises providing a model for light intensity simulating light conditions in a first period of a day. The method comprises operating the light intensity control device in accordance with the model so that light is provided to the room.

The room is a room having none, or only limited, windows allowing light from the outside to enter the room. As explained above the lack of light is disrupting to a patient situated in the room, possibly causing the patient to suffer from delirium. Therefore the present invention provides a method for controlling lighting conditions in the room automatically. Preferably a controller device, such as a computer, is used for simulating changes in light conditions, e.g. less light during dawn and dusk, bright light at midday etc. Further it is possible to simulate both cloudy conditions and sunny conditions.

The light is during the first period of time perceived as being natural light and the variation of the light intensity so that it is perceived by a person in the room that time laps. This helps a person, e.g. an ICU patient lying in bed all day to, consciously or unconsciously, register that time passes.

In an embodiment the method comprises arranging a plurality of light sources in the room so that a point in the room is illuminated from two or more angles. This is contemplated to allow illumination from several angles which provide an improved simulation of light changes during a period of time. For instance one light source could simulate light in the morning and one light source could simulate light in the afternoon, the light thus originating from different angles in the room. By providing multiple light sources arranged in the room more lighting conditions may be simulated and changes in the light conditions, giving the feeling of time passing, is provided.

In an embodiment the method comprises providing a video screen and a video source, and displaying images from the video source on the video screen. This allow for display of e.g. clouds, animals, colors, silhouettes of moving animals and/or humans and/or clouds and/or plants and/or trees, thus heightening the illusion of light and sights from the outside.

In an embodiment the light source or light sources include a color modulation device controlling the color of the light emitted. This allows color modulation and simulation of a number of light conditions. Combining color and intensity allow a more realistic light experience. E.g. the light could be redder during simulated sunrise and whiter at simulated noon. Other colors are possible, e.g. for simulating the passing of a cloud.

In an embodiment the light source or light sources includes an orientation device configured to change the orientation of the emitted light. This is one way of simulating movement of the sun. This enhances the effect of the simulation of time passing. Having a light source where a controller may adapt the orientation of the light emitted allow for simulating the changing position of the sun in the sky. Combining position simulation and color simulation and intensity allow simulation of e.g. an entire day ranging from dawn until dusk. Further, simulation of days where the sun is not shining from a blue sky may also be simulated, the presence of clouds and/or birds and/or trees further enhance the simulation.

An aspect of the present invention relates to a system for providing illumination in a room, the room comprising a wall. The system may comprise a light source including one or more individual light sources, the light source including a light controlling device for controlling intensity and/or direction of light and/or color of light emitted. The system may comprise a controller device configured to control the light controlling device in accordance with a simulation program simulating changes in daylight over a period of time.

In an embodiment the system further comprises an image display device configured to display still pictures and/or video, and an image source connected to the image display device for displaying images and/or video. The display of images and/or video is contemplated to heighten the illusion of the room being enlightened by natural light as the video and/or images may display images of clouds, birds, trees, landscape, shrubbery, flowers and the like, possibly a combination of multiple elements varying over time so as to provide variation to the viewer.

In an embodiment the light source is a light bar comprising a plurality of light sources positioned in a line. The light bar, being an elongated light source, is contemplated to be easy to install and the spatial distances provides possibility to simulate movement of the sun.

In an embodiment the light source comprises a multitude of individual light sources arranged in a matrix. The matrix of light sources is contemplated to be easy to install and the spatial distances between the light sources provides possibility to simulate movement of the sun. The matrix is contemplated to improve simulation of light from a moving sun.

In an embodiment the system comprises two spatially separated light sources. By providing two, or more, light sources, e.g. two light bars or two matrices of light sources or any combinations thereof, the effect of the simulation may be enhanced, as the viewer will experience light from different directions. Light from difference directions will provide an illusion of movement of the sun and thus time passing.

In an embodiment the room comprises two opposite walls and each wall comprises one of the spatially separated light sources. By providing the light sources at opposite walls it is possible to simulate e.g. sunrise and sunset. If the light sources are further capable of changing color and/or intensity this may add to the effect of the simulation.

In an embodiment the image display device is an LCD screen, a plasma screen or an OLED screen. The choice of display unit in an embodiment may depend of several factors, including image quality, power consumption, and availability.

In an embodiment the light source or light sources provides light in a spectrum resembling that observed on earth as emitted by the sun. The more the light sources resemble a natural light source the more believable the simulation.

In an embodiment the system further comprises a diffuser adapted to diffuse the light emitted by the light source or light sources. The diffuser helps reduce the perception that the light emitted by the light source is from a small source, e.g. a LED lamp or the like. A small light source is not perceived as natural as a light source behind a diffuser.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 1 schematically illustrates an embodiment of a system according to the present invention, FIG. 2 schematically illustrates an LED bar, FIG. 3-8 schematically illustrates different rooms comprising a number of light producing elements, FIG. 9 schematically illustrates an LED bar comprising a light diffusing element, and FIG. 10 schematically illustrates steps of a method according to the present invention.

DESCRIPTION OF EMBODIMENTS

Hospital rooms and in particular ICU environments are functional spaces that must attend the needs of attending staff, e.g., illumination, workspace, equipment presence etc, while hosting a convalescent person for possibly extend periods of time. For reasons ranging from the lack of awareness to legacy buildings, many of these environments are optimized towards the staff at the expense of the patient. A lack of adequate windows and constant "cold" illumination are common examples of features that deprive patients from environmental cues that help temporal and spatial orientation with potential impact on the onset of delirium.

This invention addresses the problem of inadequate illumination in hospital rooms that may lead to general confusion and delirium. It proposes and describes a system that supports temporal and spatial orientation by rendering lighting scenes that mimics the dynamics of a skylight window. Patients subject to the proposed illumination are expected to be better oriented in terms of time flow and room orientation. Although the system will mainly benefit patients in spaces that lack adequate windows, the possibility of rendering lighting conditions that resemble sunny 'upbeat' days will also benefit a broader range of patients during dark winters and gloomy rainy days.

Figure 1:
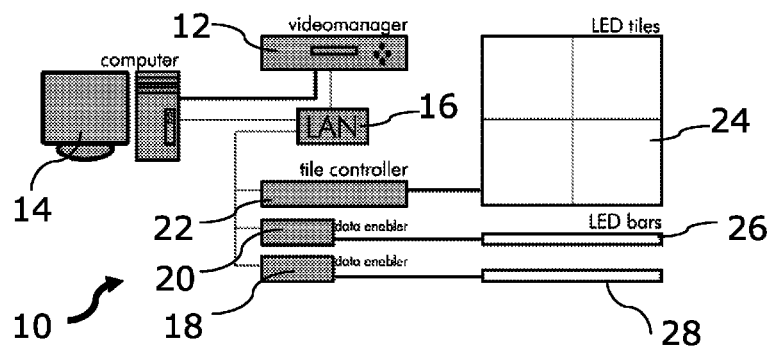

FIG. 1 schematically illustrates a presently preferred embodiment of a system 10 according to the present invention. The system comprises a Video source 12, and User interface (UI) here implemented in a computer 14. The video source 12 and the user interface 14 provides the scene content to the system and basic video commands such as start, stop. The video source/manager 12 and 14 convert video data into lighting control commands in a format suitable for distribution over a local area network 16. The Local area network (LAN) 16 distributes commands and data among the different devices in the system 10. Data enablers 18 and 20 and tile controllers 22 controls the light sources and rendering the scene from the video source 14. Here two types of light sources are illustrated, namely LED tiles 24, which are matrices of LEDs able to render light scenes based on video images and other light information controlled by the computer unit 12, e.g. light intensity, color etc. The other light source is an LED bar 26 and 28 which is a light source that shed light at different angles depending of the time of the day.

Generally a system for providing illumination in a room according to the present invention comprises a light source including one or more individual light sources, the light source including a light controlling device for controlling intensity and/or direction of light and/or color of light emitted, and a controller device configured to control the light controlling device in accordance with a simulation program simulating changes in daylight over a period of time.

Preferably the system is controlled by software executed on a control device, e.g. the computer 12. In a software implementation, the system preferably works as follows:

Users are offered a menu having three choices:

Scenes: This choice sends the user to the scene control panel.

Options: The choice sends the user to the options menu. Here the user can choose how many rooms to connect to the system.

Exit: Exits the system.

At the scene control screen of the software implementation the user may choose:

Start and stop the scene. The scene will start rendering according to the system date and time. The date and time keep the dynamic scene changing during the day.

Limit the light intensity of the scene according to the patients' wishes.

Limit the light intensity of the work area lighting to provide for a suitable work environment for the staff.

Turn the extra features on or off according to the patients' wishes. Extra options include natural elements such as silhouettes of moving clouds, flying birds or plants, etc.

Figure 2:
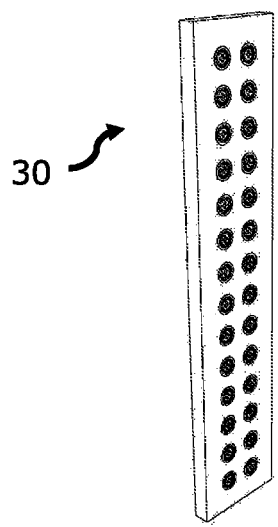

FIG. 2 schematically illustrates an embodiment of an LED light bar 30. The LED light bar 30 comprises a number of light sources, here 28 LED lamps each having a number of LED light producing elements. The light bar 30 comprises a plurality of light sources positioned in a line. Here the light bar comprises two rows or lines of LED lamps. The 28 LED lamps provide the possibility to adapt the light emitted by the LED light bar 30. The LED lamps may be controlled in order to change light parameters such as color and/or intensity. Further it may be possible to orientate the LED lamps individually so that controlling which LED lamps to light at a given intensity and color a given light scenario may be simulated, e.g. sunrise, noon or sunset, or any time in between that. Other light sources than LED light sources may be envisioned without departing from the scope of the present invention.

FIG. 3 schematically illustrate a room 40 having one wall 42 with seven LED light bars, each denoted 44. The seven LED light bars allow simulation of the sun shining in through one or more windows in the room. The room does not actually have any windows but the LED light bars 44 simulate conditions in a room having windows. In other embodiments the number of LED light bars 44 may be different from seven, depending on factors such as room size and/or desired maximum intensity.

FIG. 4 schematically illustrate a room 50 having two LED panels 52 and 54 in the form of two square LED matrices comprising a multitude of LED light sources. As in the embodiments described above, the intensity, color and direction of the LED light sources may be controlled so as to provide the simulation of time passing.

In the embodiments illustrated in FIGS. 3 and 4, and for the remaining embodiments illustrated herein, the system comprises at least two spatially separated light sources. The spatially separated light sources provides an enhanced simulation of the movement of the sun and thereby the changes in light conditions inside the room.

In the embodiments illustrated in FIGS. 3 and 4, the room comprises two opposite walls and each wall comprises one of the spatially separated light sources. The positioning of light sources, e.g. LED bars and/or LED matrices, provide an enhanced effect of the simulation, as it is possible to simulate a longer period of movement, e.g. both sunrise and noon, or from sunrise to sunset.

In an embodiment it would be advantageous that the light source or light sources provides light in a spectrum resembling that observed on earth as emitted by the sun. The more the light that is emitted from the light sources resembles the light emitted from the sun, the more realistic the simulation. In an embodiment the spectral distribution of the light emitted by the light source or light sources may be controlled and adapted so as to enhance the effect of the simulation. The color of the light at dawn is different from the color of the light at noon.

Figure 5:
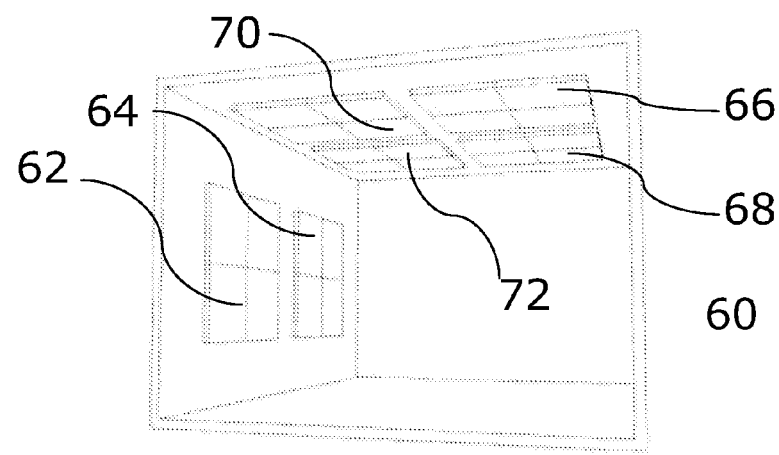

FIG. 5 schematically illustrate a room 60 having six LED panels 62, 64, 66, 68, 70 and 72 in the form of square LED matrices each comprising a multitude of LED light sources. The panels 63 and 64 are positioned on a wall. The panels 66, 68, 70 and 72 are positioned in the ceiling. As in the embodiments described above, the intensity, color and direction of the LED light sources may be controlled so as to provide the simulation of time passing. Different, spatially separated, locations of the light sources provide an enhanced effect of the simulation.

Figure 6:
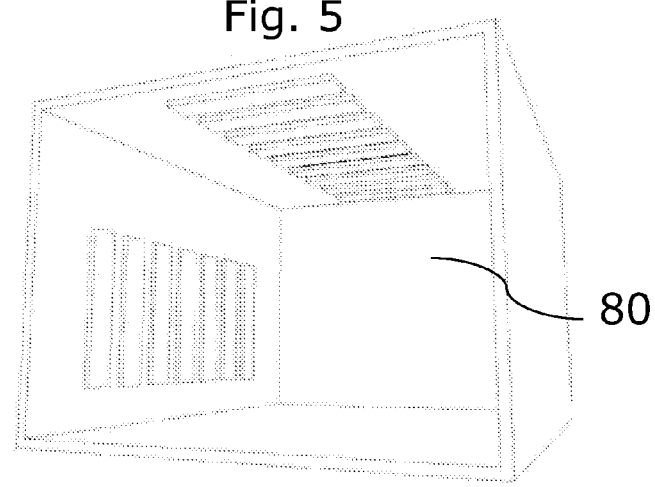

FIG. 6 schematically illustrate a room 80 having seven LED panels in the form of oblong, LED bars each comprising a multitude of LED light sources positioned on a wall. Further, nine oblong, LED bars each comprising a multitude of LED light sources is positioned on the ceiling. As in the embodiments described above, the intensity, color and direction of the LED light sources may be controlled so as to provide the simulation of time passing. Different, spatially separated, locations of the light sources provide an enhanced effect of the simulation.

Figure 7:
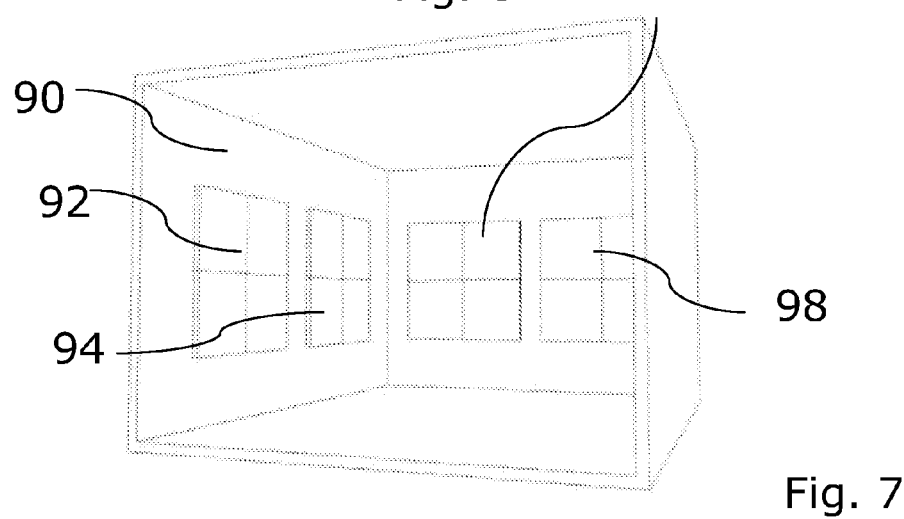

FIG. 7 schematically illustrate a room 90 having four LED panels 92, 94, 96 and 98 in the form of square LED matrices each comprising a multitude of LED light sources. The panels 92 and 94 are positioned on a wall. The panels 96 and 98 are positioned on an adjacent wall. As in the embodiments described above, the intensity, color and direction of the LED light sources may be controlled so as to provide the simulation of time passing. Different, spatially separated, locations of the light sources provide an enhanced effect of the simulation.

Figure 8:
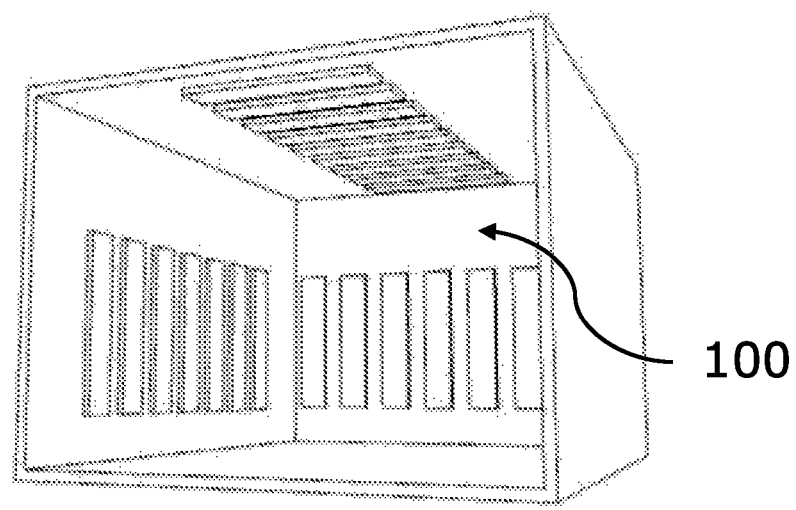

FIG. 8 schematically illustrate a room 100 having seven LED panels in the form of oblong, LED bars each comprising a multitude of LED light sources positioned on a wall. Further, nine oblong, LED bars each comprising a multitude of LED light sources is positioned on the ceiling. As in the embodiments described above, the intensity, color and direction of the LED light sources may be controlled so as to provide the simulation of time passing. Different, spatially separated, locations of the light sources provide an enhanced effect of the simulation.

In an embodiment any of the systems described above may further comprise an image display device configured to display still pictures and/or video, and an image source connected to the image display device for displaying images and/or video, such as the image display device and video source illustrated in FIG. 1.

Any of the image display devices described in the present application may be an LCD screen, a plasma screen or an OLED screen, or a plurality of image display devices may be provided. The plurality of image display devices may then be of the same type, or be a mix of different types of image display devices.

Figure 9:
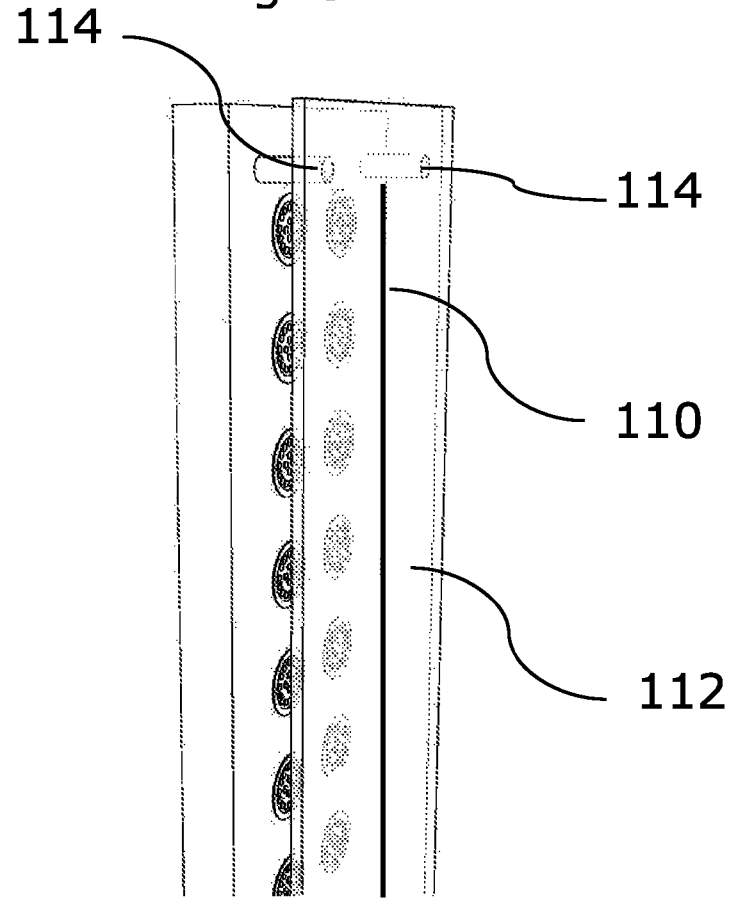

FIG. 9 schematically illustrates an embodiment of a LED bar 110 further comprising a diffuser 112 adapted to diffuse the light emitted by the light source or light sources. The diffuser 112 may be translucent or comprise translucent parts. The diffuser 112 may comprise reflective and translucent parts in combination. The diffuser 112 may comprise translucent parts and transparent parts. The diffuser 112 is here illustrated as a plate being mounted at a distance from the surface of the LED bar 110 by elements 114.

Figure 10:
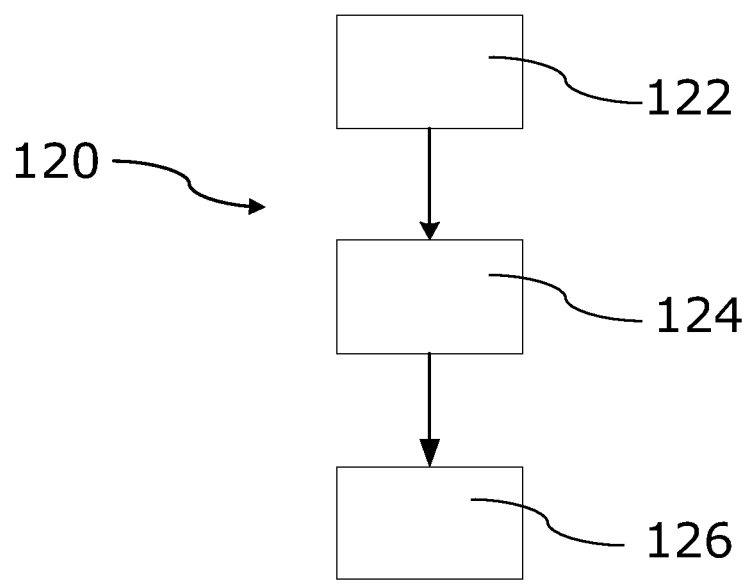

FIG. 10 schematically illustrates steps of a method 120 for providing light to a room, the room comprising a wall. The method comprises the steps of arranging 122 in the room a light source having a light intensity control device. The method further comprises the step of providing 124 a model for light intensity simulating light conditions in a first period of a day. The method further comprises the step of operating 126 the light intensity control device in accordance with the model so that light is provided to the room.

The light is during the first period of time perceived as being natural light and the variation of the light intensity is performed so that it is perceived by a person in the room that time lapses. This helps a person, e.g. an ICU patient lying in bed all day to, consciously or unconsciously, to register that time passes. The first period of time may be 1 hour. The period may be looped so that a shorter period than 24 hours may be defined and used for the simulation. The simulation may be based on a mathematical equation indicating the position, or at least the inclination, of the sun. One way of determining the parameters for the light could be to base the calculation on the actual time. A table could be provided defining all relevant parameters as a function of time so that the calculation does not need to be performed each time. The simulation could be based on typical values pertaining to a given time of year, e.g. summer, spring, fall or winter. Further, the system provides possibility to allow a person, e.g. a nurse or other staff, to manually control parameters, such as light intensity, in order to accommodate specific patient needs and/or needs for the staff attending a patient in the room.

Before performing the steps of the method as described above the following steps may be performed, namely arranging a plurality of light sources in the room so that a point in the room is illuminated from two or more angles. This allows illumination from several angles which provide an improved simulation of light changes during a period of time. For instance, one light source could simulate light in the morning and one light source could simulate light in the afternoon. By providing multiple light sources arranged in the room more lighting conditions may be simulated and changes in the light conditions, giving the feeling of time passing, is provided.

The method may further comprise providing a video screen and a video source, and displaying images from the video source on the video screen. The images may include clouds, animals, colors, silhouettes of moving animals and/or humans and/or clouds and/or plants and/or trees. It is contemplated that moving images increase the perception of time and thus the effect of the simulation.

As described elsewhere the light source or light sources may include a color modulation device controlling the color of the light emitted, color modulation allows simulation of a number of different light conditions. Combining color and intensity allow a more realistic light experience.

The light source or light sources may include an orientation device configured to change the orientation of the emitted light. The change may be dynamic, i.e. the direction may be changed during the simulation. The orientation device may alternatively be a device permanently changing the direction of the light emitted, i.e. a light-guide redirecting the light from the light source. This may be advantageous if the light sources are positioned in a specific orientation due to production requirements, and this direction is less efficient in relation to the simulation, thus the orientation device provide the possibility to mount the light sources in an efficient way and still achieve the optimum simulation result. Having a light source where a controller may adapt the orientation of the light emitted allow for simulating the changing position of the sun in the sky. Combining position simulation and color simulation and intensity allow simulation of e.g. an entire day ranging from dawn until dusk. Further, simulation of days where the sun is not shining from a blue sky may also be simulated, the presence of clouds and/or birds and/or trees further enhance the simulation.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for providing simulated daylight to a room having a wall, the method comprising the acts of:
arranging in the room a light source configured to emit light having an intensity, color, and orientation, a light intensity control device and an orientation device, the orientation device configured to change the orientation of the light emitted by the light source, and the light intensity control device configured to change an intensity of the light emitted by the light source;

providing a model comprising a plurality of light orientation and light intensity changes over a plurality of daylight hours, wherein the model simulates changes in daylight conditions over the plurality of daylight hours; and operating the light intensity control device and the orientation device in accordance with the model to implement the plurality of light orientation and light intensity changes to provide simulated daylight to the room over a plurality of daylight hours.

2. The method according to claim 1, further comprising the acts of:

arranging a plurality of light sources in the room; and
illuminating a point in the room from two or more angles.

3. The method according to claim 2, wherein a first light source of the plurality of light sources simulates light depending on a first time of day and a second light source of the plurality of light sources simulates light depending on a second time of day different from the first time, the first and second light sources emitting light from different angles in the room.

4. The method according to claim 1, further comprising the acts of:

providing a video screen and a video source; and
displaying images from the video source on the video screen.

5. The method according to claim 4, wherein the images comprise at least one of clouds, animals, colors, and silhouettes of moving animals, humans, clouds, plants and trees.

6. The method according to claim 1, wherein the light source comprises a color modulation device, and wherein the method further comprises the step of operating the color modulation device in accordance with the model to control a color of the emitted light.

7. A system for providing simulated daylight in a room having a wall, the system comprising:

a light source comprising:
one or more individual light sources, each light source configured to emit light having an intensity, color, and orientation;
a light controlling device configured to control at least one of the intensity and the color of the emitted light of at least one of the individual light sources; and
an orientation device configured to change an orientation of the emitted light of at least one of the individual light sources; and a controller device configured to control the light controlling device and the orientation device in accordance with a simulation program, wherein the simulation program simulates changes in daylight conditions over a plurality of daylight hours, the changes in daylight conditions comprising a plurality of changes in orientation of the emitted light, and a plurality of changes in at least one of an intensity and a color of the emitted light.

8. The system according to claim 7, further comprising:
an image display device configured to display at least one of still pictures and video; and an image source connected to the image display device for displaying the at least of one of the still pictures and video.

9. The system according to claim 8, wherein the image display device is one of an LCD screen, a plasma screen and an OLED screen.

10. The system according to claim 7, wherein the light source is a light bar comprising a plurality of the one or more individual light sources positioned in a line.

11. The system according to claim 7, wherein the light source comprises a plurality of the one or more individual light sources arranged in a matrix.

12. The system according to claim 7, further comprising two spatially separated light sources.

13. The system according to claim 12, wherein the room comprises two opposite walls and each wall comprises one of the two spatially separated light sources.

14. The system according to claim 12, wherein a first of the two spatially separated light sources simulates light at a first time of day, the first time of day being morning, and a second of the two spatially separated light sources simulates light at a second time of day, the second time of day being afternoon.

15. The system according to claim 7, wherein the light source provides light in a spectrum configured to resemble that observed on earth as emitted by the sun and the controller device controls the light controlling device for output of the emitted light that simulate movement of the sun over the period of time in the day.

16. The system according to claim 7, further comprising a diffuser configured to diffuse the emitted light by the light source.

17. The system according to claim 7, wherein the simulation program combines the color, the intensity and the orientation of the emitted light to simulate the changes in daylight over the period of time in the day, the period of time in the day being an entire day ranging from dawn until dusk.

18. The system according to claim 7, wherein the controller device is further configured to dynamically control changes in at least one of the color, the intensity and the orientation of the emitted light in accordance with at least one of a real-date and a real-time information stored on the controller device during the period of time in the day, and wherein the real-date and the real-time is continually and automatically updated on the controller device to dynamically control the changes.

19. The system according to claim 7, wherein the controller device is configured to store a table of average values defining color, intensity and orientation of emitted light from the sun as a function of a time of day and a time of year, and wherein the simulation program simulates the changes in daylight over the period of time in the day in accordance with the table of average values for output of the emitted light that simulate movement of the sun during the day and the time of year.

20. The system according to claim 7, wherein the orientation device is configured to change a direction of the emitted light during the period of time, and wherein the orientation device comprises a light guide to redirect the emitted light from the light source.

* * * * *